United States Patent [19]

Saunier et al.

[11] 3,975,271

[45] Aug. 17, 1976

[54] PROCESS FOR STERILIZING WATER BY THE COMBINATION OF CHLORINE AND ANOTHER HALOGEN

[76] Inventors: Bernard Saunier, 39 rue du Chemin Vert, 49 Cholet; Antoine Derreumaux, 24 rue de Longchamp, 75116 Paris, both of France

[22] Filed: Sept. 23, 1974

[21] Appl. No.: 508,792

Related U.S. Application Data

[63] Continuation-in-part of Ser. No. 324,382, Jan. 17, 1973, abandoned.

[30] Foreign Application Priority Data

Feb. 15, 1972 France .............................. 72.04924
July 21, 1972 France .............................. 72.26387

[52] U.S. Cl. ................................................. 210/62
[51] Int. Cl.² ............................................ C02B 1/36
[58] Field of Search ................. 210/59, 62, 60, 169; 423/500

[56] References Cited
UNITED STATES PATENTS

| | | | |
|---|---|---|---|
| 2,443,429 | 6/1948 | Marks et al. ........................... | 210/62 |
| 3,133,877 | 5/1964 | Mixer et al. ........................... | 210/62 |
| 3,732,164 | 5/1973 | Pressley et al. ........................ | 210/62 |

OTHER PUBLICATIONS

Weber W. J. Jr.; "Physicochemical Processes for Water Quality Control"; J. Wiley & Sons, Inc.; 1972; pp. 434-437.

*Primary Examiner*—Charles N. Hart
*Assistant Examiner*—Benoit Castel
*Attorney, Agent, or Firm*—William A. Drucker

[57] ABSTRACT

For water disinfection or sterilization, for instance of drinking, municipal waste, industrial or swimming-pool waters, there is introduced in a reactor a mixture of chlorine and of a salt of another halogen (bromine and/or iodine) in such conditions that mainly free halogen and hypohalogenous acid of said other halogen are produced; the mixture is supplied to the water, in such amounts that, an halogenated residual capable of destroying microbial contamination in the system, is maintained.

7 Claims, 6 Drawing Figures

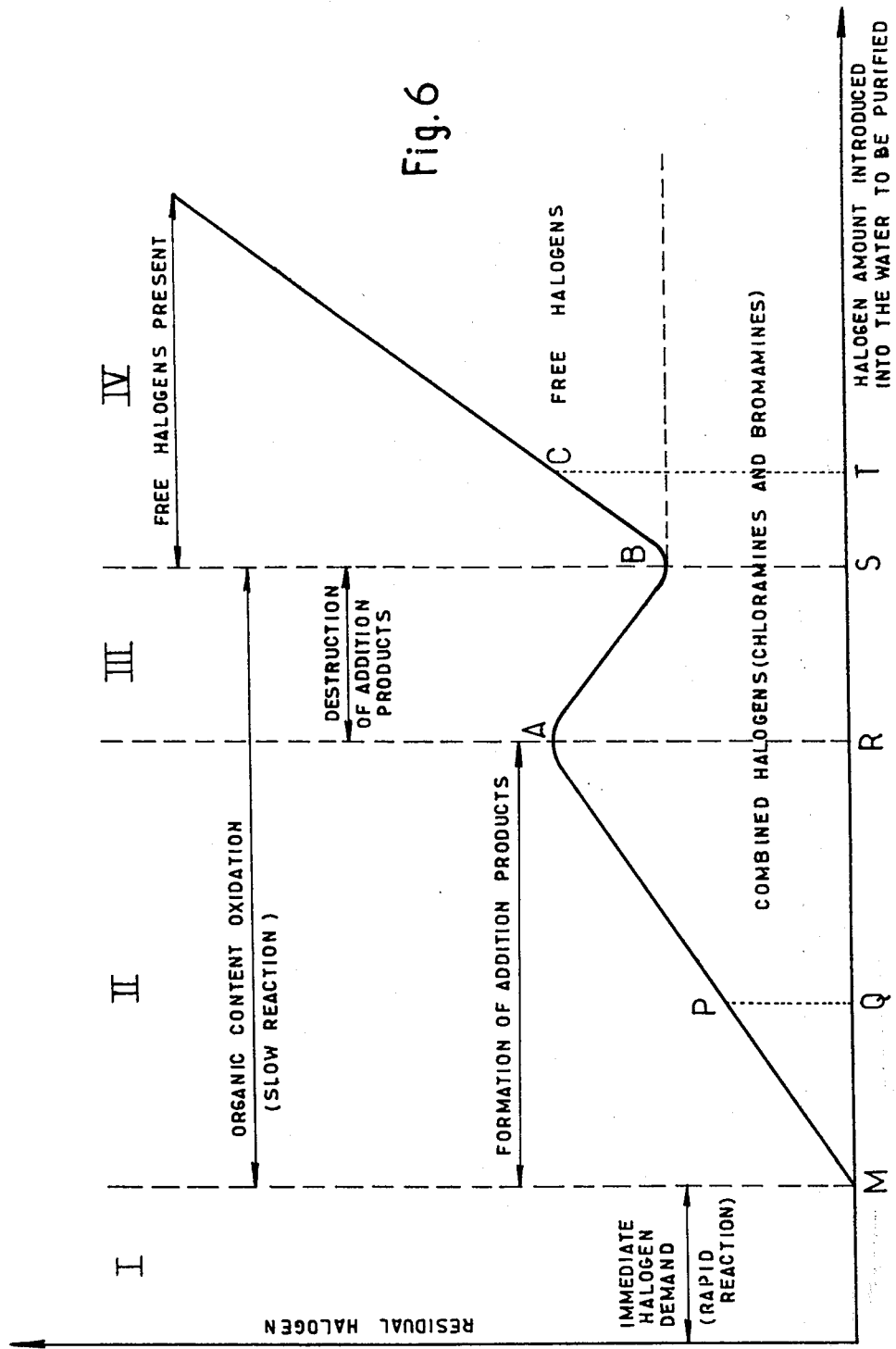

PROCESS FOR STERILIZING WATER BY THE COMBINATION OF CHLORINE AND ANOTHER HALOGEN

This is a continuation-in-part of application Ser. No. 324,382 filed Jan. 17, 1973, now abandoned.

This invention relates to water treatment sterilization or mere disinfection.

Drinking municipal waste, industrial or swimming-pool water is currently treated with halogens whose oxidizing, germicidal and deodorizing action is well known.

As regards drinking water, the most common sterilization treatment is with chlorine and by-products thereof (notably sodium hypochlorite).

Free chlorine has a strong germicidal action and its presence in water supplied to consumers is usually considered an essential protection against pollution.

Unfortunately, during the complex reactions which occur between the chlorine and the organic pollutants, various chloramines form, some of which may not be completely oxidized by the chlorine. It may therefore come about that when reaction is complete, the water supply only in fact contains chloramines, whose germicidal action is very slight and some of which have a disagreeable smell and taste.

Now, it is very difficult in practice to control the residual chloramine content in the water supply. The water to be treated in fact contains a greater or lesser quantity of nitrogenous by-products, either as a function of the source of supply (e.g. well water or surface water) or because it has been contaminated in the pipes. When the organic content of the water is particularly high at some point in the system, it may be practically impossible to make it suitable for domestic consumption and pleasant to drink. The amount of chlorine which is generally considered acceptable to introduce during treatment then being insufficient to make the water supply contain residual free chlorine. Moreover, when such contamination occurs in the system, the conversion of the chlorine into chloramines does not allow the chlorine to exert its powerful bactericidal action, and in such cases, the water is often not bacteriologically drinkable.

The germicidal actions of bromine or iodine are also wellknown. Besides, with nitrogenous compounds, they form bromamines or iodamines which are much less stable and which have germicidal action much greater than that of the chloramines compared on a molar basis, while still not exhibiting the inconvenience of the chloramines as to toxicity and foul smell. However bromine and iodine are rather expensive, and of delicate handling.

One of the objects of the invention for municipal drinking water is to remedy these disadvantages and to provide a water-treatment process which enables it to be made drinkable more efficiently and even in cases where there are previously-known processes being ineffective.

It covers a process consisting mainly of combining the action of chlorine and another halogen (bromine and/or iodine), in such amounts that a halogenated residual capable of destroying any possible contamination in the system is maintained in the drinking water of the system.

This process leaves a small quantity of chlorinated-by-products, which is a very distinct improvement over the process with chlorine, which, in case of contamination or insufficient chlorination, led to the final formation of unpleasant smelling and tasting chloramines.

The process according to the invention consists essentially in preparing in a reactor a mixture of chlorine and of bromide and/or iodide, in such molar ratios, pH and temperature condition that free bromine and/or free iodine are released, and in subsequently feeding the thus reacted mixture into the water to be treated.

the reacted mixture according to the invention, efficiently sterilizes the water into which it is introduced, makes it possible to deal with possible contamination in the system and, above all, does not deteriorate the organoleptic properties of the water, the bromamines which possibly form having the advantage of having no disagreeable taste or smell, besides, they are not stable and in all cases, have a disinfecting action much greater than that of the chloramine.

In a first mode of operation, the halogen content in said mixture is sufficient to provide for both the oxidation of the nitrogenous matter contained in the effluent and a residual halogen content which enables satisfactory disinfection to be achieved.

In a second mode of execution, preferred notably when the effluent comprises a high concentration of nitrogenous matter and/or a changing concentration of nitrogenous products, the treatment comprises injecting chlorine in sufficient quantity to meet the effluent's halogen immediate demand, followed by injection of the above-mentioned mixture, which then has a suitable halogen content to supply a residual which effects the required disinfection. By halogen immediate demand is meant the amount of halogen that it is necessary to introduce into the water in order that, after 10 mn, the total residual halogen content in the water be equal to 0.05 mg/l (as expressed in $Cl_2$). Demands greater than 2 mg/l are considered as high.

As a matter of fact, it has already been proposed to overcome the drawbacks due to the formation of chloramine by introducing into the water either bromine or iodine alone, or bromine or iodine, and chlorine. This process has the great disadvantage of necessitating the handling of free bromine $Br_2$ or iodine $I_2$. Besides, when the $Br_2$ or the $I_2$ is used, a greater quantity of the expensive matter is required because when it is introduced into the water, the following reactions occur:

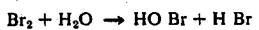

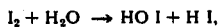

so, only half the bromine or the iodine introduced is available for disinfection or sterilization whereas in the case of the invention by introduction of a halogen salt all the halogen is used for disinfection or sterilization.

In order to overcome the drawback of handling corrosive, volatile products, it has also been proposed to introduce in the water separately chlorine and a bromide or iodide. It was expected that the aqueous chlorine and the halogenide would react to produce either bromine or iodine, or a hypobromous or hypoiodous acids, all being compounds, exhibiting high germicidal action. However, in ordinary conditions, very little bromine or iodine or acids are formed and this process remains very expensive while still little effective.

A process which was deemed to be more effective while less onerous because no bromine was expected to remain inactive, consists in preparing bromine chloride BrCl.

In fact: BrCl is not needed in order to have a good disinfection and/or sterilization, since $Br_2$ and HOBr are the active compounds in disinfection and sterilization. When introducing a mixture of chlorine with the bromide salt in a reactor, in concentrated solution as it is done in the present invention, when the temperature is less than 10°C, and the molar ratio of chlorine over bromine is greater than 2 there is formation of BrCl, but this does not add anything in the efficiency of the process. But when chlorine and bromide are added separately to water to be treated contaning nitrogenous compounds, even when the temperature is smaller than 10°C and the molar ratio is greater than 2, there is no formation of BrCl or $Br_2$ or HOBr, and there is no good disinfection as further shown.

A better understanding of the invention will be obtained from the following description.

In the attached drawings:

FIG. 6 is an explanatory graph.

FIG. 1 shows an installation of the general type described in the abandoned U.S. patent application filed on 9th August 1972 under Ser. No. 279,038 in the name of Marc LAMBERT, for "Process and Device for manufacturing solutions of halogens and their by-products."

Figure 1:
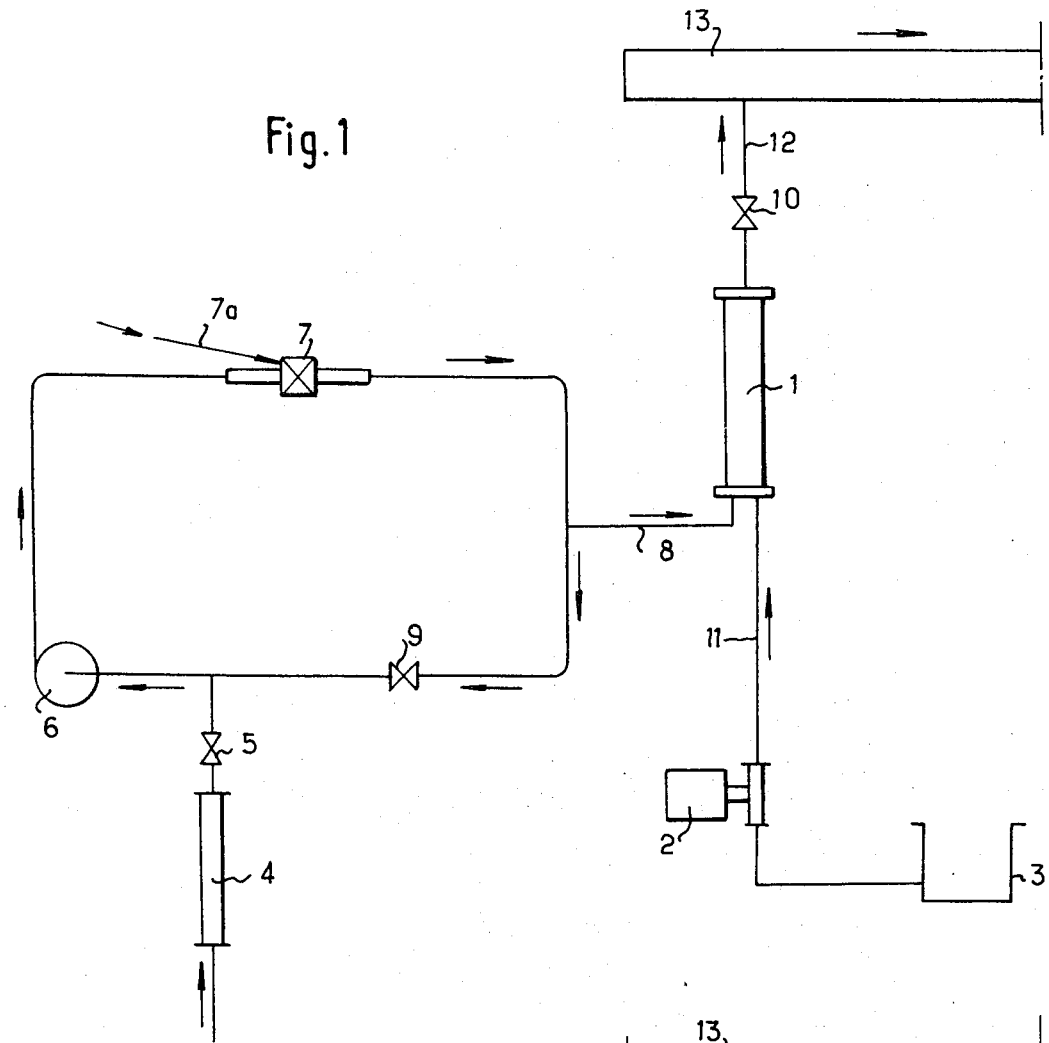
FIG. 1 is a diagrammatic view of a preferred form of embodiment of a device for disinfecting or sterilizing water to make it drinkable, in accordance with the invention.

The installation comprises: a reactor 1, injection components 2-3, for injecting a potassium or sodium halogenide solution into the reactor, and a circuit (4 to 9) feeding the reactor with chlorinated water.

A rotameter 4 and an adjusting valve 5 enable a controlled and adjustable flow of raw water to be injected into the chlorinated water circuit. The circuit feeding chlorinated water to the reactor moreover includes an over-pressure pump 6, a hydro-ejector or venturi 7, an outlet pipe 8 and a valve 9.

The raw water is enriched with chlorine in this circuit by virtue of the continuous circulation under pressure and in closed circuit, accompanied by a continuous injection of chlorine into the circuit. The chlorine concentration is adjusted to the value corresponding to the maintenance of an acid pH ranging from 2.5 to 5.5 and preferably smaller than 3.5, which latter value corresponds to a concentration ranging between 700 to 1000 mg/l according to the buffer capacity of the water. In the cited copending application, detailed means are shown for regulating the chlorine concentration.

The chlorine injection is done at 7a by chlorine suction, preferably in a gaseous state, or else in the form of chlorine water, sodium or calcium hypochlorite or more generally any chlorine by-product. When chlorine water or other chlorine by-product is used, hydrochloric acid (HCl) must also be added in order to acidify the mixture to the required pH range.

The pump 6 carries out a mixing which facilitates the chlorine enrichment and, moreover, compensates the pressure drop in the circuit; the chlorine water therefor comes out under pressure through the pipe 8 and can feed the reactor 1 directly under pressure. The chlorine concentration and the flow are strictly controlled.

The halide, e.g. the bromide is injected by means of the adjustable proportioning pump 2 from the storage tank 3.

In the reactor 1, the chlorine reacts with the bromide to produce nascent bromine. Tests have shown that in acid solution (pH $\leq$ 3.5) bromine is released stochiometrically from the bromide in less than 3 minutes at 15°C. The reaction velocity increases with the temperature which must be preferably maintained over 10°C.

As the apparatus enables the proportions of chlorine and bromide which react together to be strictly controlled, the free chlorine and bromide content is constantly controlled, prior to its use as a treatment agent.

The solution 12, containing the free halogens is sent into the water to be sterilized 13.

The reactor 1 is well arranged, as explained in the above-mentioned patent application, to provide continuous mixing, brominated water and perfect homogenisation of the mixture. The chlorinated water injected at 8 is itself already very homogeneous, due to the properties of the circuit which produces it.

The valve 10 makes it possible to adjust the outflow of treated water and, in cooperation with components 4 and 5, to provide for its precise compensation by raw water intake, the quantity of chlorinated water circulating in the closed circuit thus remaining constant.

Figure 2:
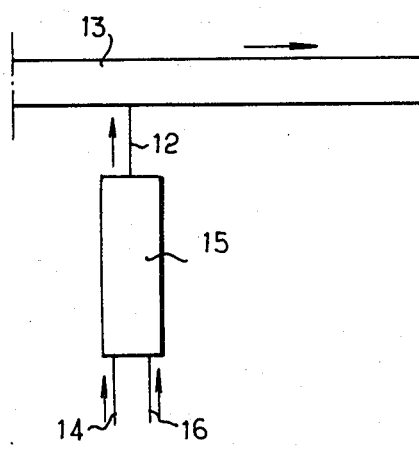
FIG. 2 shows a first variant of this device.

In the variant in FIG. 2, shown diagrammatically, concentrated chlorinated water, 14, and a bromide solution, 16, in suitable proportions are brought to react into a reactor 15 which enables the mixture to be homogenised. The reaction products react on the organic matter in the waste water 13 as indicated above, while sterilizing it. As an example, the gaseous chlorine and the aqueous solution of bromide are injected into the reactor at a controlled rate. A iodide solution may be substituted for the bromide solution 16 as well as a mixture of iodide and bromide solutions. Any iodide and/or bromide is suitable for use here, no matters under which form it (or they) is (are) available. Any known injection means may be used (dosimeter, pump, venturi ... ).

The disinfection or sterilization processing according to the invention may be carried out upstream or downstream or any other treatment which might be necessary for other purposes, such as filtration, decantation and even prechloration. In this latter case, according to a particular embodiment of the invention the amount of prechlorating chlorine is adjusted so as to be just enough for satisfying the halogen immediate demand; this demand corresponds to the oxidation of the reducing mineral compounds contained in the water for instance $SH_2$, which compounds react quasi-instantaneously with the chlorine. In the explanatory diagram (FIG. 6) which shows the breakpoint curve, the amount of halogen satisfying the immediate demand is shown at M.

Figure 3:
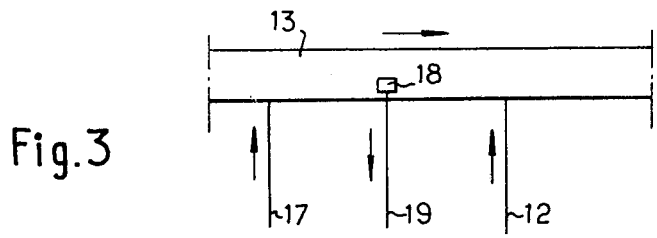
FIGS. 3 and 4 show further variant of this device where a residual halogen analyzer is used.

FIG. 3 illustrates an alternative of the process of the invention, using prechloration.

The effluent 13, to be treated, circulates within an open-air channel along the direction shown by the arrow or in a closed channel. Chlorine or chlorine water is injected thereinto at 17 while the mixture 12 defined with reference to FIGS. 1 and 2 is injected downstream. Between the two injection points, there is inserted within channel, in the water flow, a means 18, of the measuring and transducer type, which measures the residual chlorine in the water and which transmits, via wire 19, the measured information to an electrical circuit, not shown, which regulates the chlorine injection rate at 17 in order to maintain the measured chlorine concentration to the desired value. This method which allows the meeting of the immediate demand in halogen, enables to regulate the mixture 12 flow rate only with respect to the effluent water rate.

Figure 4:
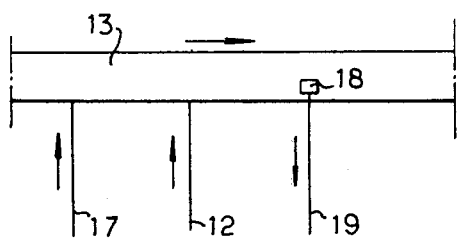

The device shown in FIG. 4 differs from that of FIG. 3 only by the fact that analyser means 18 are placed downstream the mixture 12 injection. This arrangement may be usef if both the water 13 flow and the mixture 12 rate are constant, in which particular case, the measurement made upstream the mixture injection remains a function of the sole prechloration rate.

Figure 5:
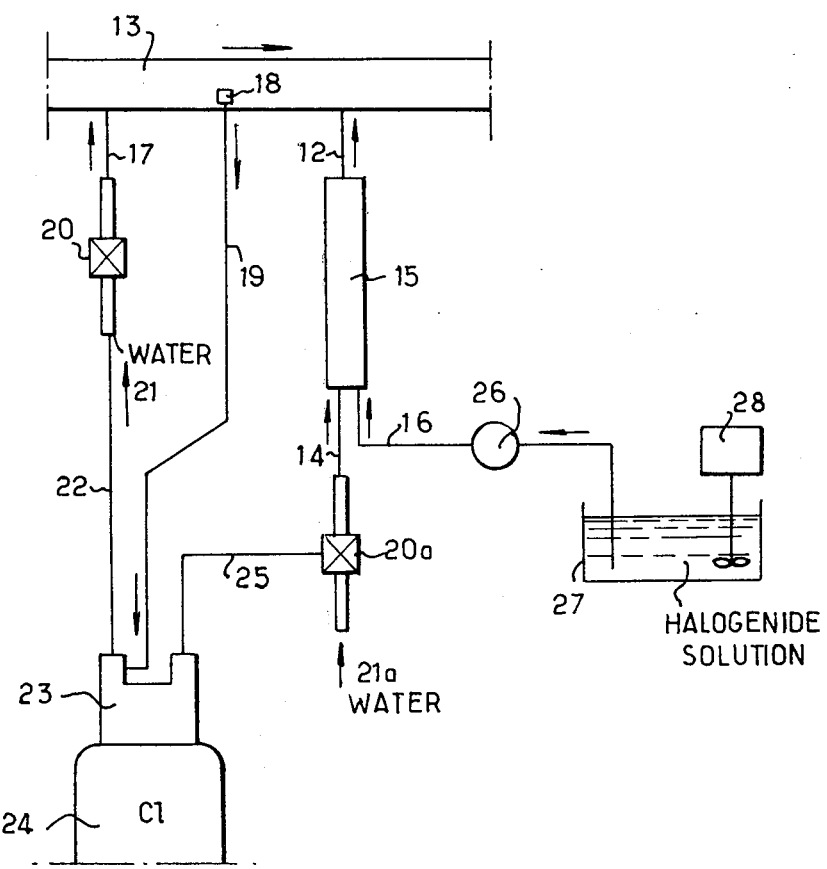
FIG. 5 is a basic diagram of an apparatus for disinfecting or sterilizing waste water in accordance with the embodiment showin FIGS. 2 and 3.

FIG. 5 shows a preferred installation for carrying out the water treatment process according to the invention, embodying the features shown in FIGS. 2 and 3.

The effluent or waste water to be treated is shown at 13. It circulates along the arrow from the left side to the right side.

Gaseous chlorine discharged from a bottle 24 through a chlorometer 23 is fed, through pipe 22, to a hydroejector 20 which receives at 21 water under pressure, the latter creating a depression in the pipe 22. Thus, at 17, concentrated chlorinated water is injected into water 13. The chlorine amount injected varies from 0 to 15 mg/l, it being a direct function of the reducing mineral compounds in the effluent. A typical feature of the immediate demand is comprised between 1–5mg/l. The residual chlorine content is analysed at 18, one to five minutes after the chlorine injection has been started. Although a residual content of 0.1mg/l to 5mg/l may be tolerated, it is generally preferred to limit it below 0.5mg/l.

The immediate demand being satisfied, the mixture 12 (chlorine-bromine and/or iodine) only aims to supply the amount of halogenated compound necessary for treating the residual water; none part of this mixture is wasted for meeting the immediate demand.

Gaseous chlorine is fed, through pipe 25 to an hydroejector 20a, wherein it is mixed with the pressured water fed at 21a. The concentrated chlorinated water, 14, at the output of ejector 20a, is fed to the tubular reactor 15, which receives, at 16, a concentrated halogenide solution 27 homogenized by means of agitator 28, and pumped by pump 26 into pipe 16 discharging into reactor 15.

In reactor 15, the contact duration time between the halogenide solution and the chlorine water varies from 1 to 15 minutes according to the reaction velocity, the latter being a function of both the pH and the temperature, which should not be lower than 10°C while the pH should not exceed 5.5 and preferably be around 3.5.

Mixture 12, as in the preceding figures, is injected in the effluent to be treated. Generally, disinfection is achieved with 1 to 10mg/l of halogen (computed in chlorine) and sterilization necessitates the use of 10 to 50mg/l. The optimum ratio chlorine/bromide or chlorine/iodide or chlorine/iodide + bromide varies with the proportion of ammonia in the water and may range from a molar ratio of 1/0.05 to 1/2 where 1 is for chlorine.

The results obtained in processing water according to the method which has just been described and the advantages of the same over known methods will become more apparent from the following, where are reported the results of comparative tests.

1. Comparison between the disinfection by chlorine alone and by bromine alone.

The tests were carried in a laboratory, on 100ml of filtered waste water, at 15°C, in a pH 7.7 solution; the contact lasted 20 min.

The initial amount of total Coliforms was $2.10^7$ in 100ml and that of $NH_3$—N was 28mg per liter.

The analysis was carried out by means of the filtering membranes used in bacteriology. The results shown in the following table clearly show that bromine has a much higher germicidal action than chlorine, at equal concentration. Indeed, after 20 min, there remains $1.5 \times 10^4$ total coliforms in 100ml when 4mg/l of chlorine are used, while only $1.3 \times 10^2$ coliforms are left when 4mg/l of bromine is used.

In the following tables the amounts of coliforms are the total amounts measured after 20 min. and the amounts of halogen indicated are the amounts introduced except when it is specified that it is the residual halogen:

Table 1

| Bromine mg/l | Coliforms in 100ml |
| --- | --- |
| 1 | $1.5 \times 10^6$ |
| 2 | $1.2 \times 10^5$ |
| 3 | $1 \times 10^4$ |
| 4 | $1.3 \times 10^2$ |

| Chlorine mg/l | Coliforms in 100ml |
| --- | --- |
| 1 | $5 \times 10^6$ |
| 2 | $5 \times 10^5$ |
| 3 | $1.2 \times 10^5$ |
| 4 | $1.5 \times 10^4$ |

2. Comparison between the disinfection by means of chlorine alone, that by means of a mixture of chlorine and bromine, and that by means of a mixture of chlorine and iodine, the mixture being prepared in a reactor according to the invention The tests were carried out with a city waste water mixed with treated industrial effluents, the pH was 7.5 and the temperature 13°–14°C.

The apparatus used is that described with reference to FIG. 5 with and without pre-chloration. The injected amounts of halogens were determined over 24 hours; the amount in mg/l have been computed from the flow rate.

The chlorine immediate demand varied between 3 and 6mg/l along the test period, the variation being caused by the discharge, into the city water, of reducing matters from several industrial plants.

Filtering membranes were used for the bacteriological analysis; the residual chlorine was measured by amperometry.

In the following tables, the indicated amounts of halogen are mean values over 24 hours, the bacteriological analyses were made after 30 min of contact. All measurements (coliforms and residual halogen) are the mean value of 3 analyses.

Tables 2a

| | without prechloration | | |
| --- | --- | --- | --- |
| Chlorine mg/l | Bromine mg/l | Coli in 100 ml | Residual halogen computed in chlorine |
| 7.2 | 0 | 70,000 | 2.5 |
| 7.0 | 4.1 | 15,000 | 1.8 |
| 6.9 | 10.2 | 10,000 | 1.2 |
| 7.1 | 16.1 | 11,000 | 0.15 |

Tables 2a-continued

| Chlorine | Iodine | Coli | Residual halogen |
|---|---|---|---|
| 6.8 | 0 | 74,000 | 2.7 |
| 7.1 | 8.4 | 11,000 | 2.6 |
| 7.2 | 16.2 | 1,100 | 2.8 |
| 6.9 | 24.7 | 800 | 2.5 |

Tables 2b

| Chlorine For prechloration | with prechloration Chlorine in the reactor (mixture) | Bromine | Coli |
|---|---|---|---|
| 5.0 | 1.8 | 0 | 80,000 |
| 4.5 | 1.75 | 2 | 13,000 |
| 4.8 | 1.78 | 4 | 1,100 |
| 5.5 | 1.85 | 6 | 900 |

These results show the interest of effecting the prechloration under the experimental conditions. Indeed, the demand in bromine or iodine is much lower at a given total chlorine amount and a comparable germicidal effect.

This advantage results from the fact that, after the initial demand has been met, the chlorine-bromine/iodine mixture acts only as a disinfecting or sterilizing agent, while, when no prechloration has been effected, the mixture first satisfies the intial demand and thereafter exerts a germicidal action.

Comparison of tables 2a and 2b also show how great is the economical interest in using prechloration.

Tables 2a and 2b also give interesting information as to the optimal molar ratios between chlorine and bromine, for obtaining the best treatment. Best results were obtained with the following Cl/Br ratios:

| Cl mg/l | Br mg/l |
|---|---|
| 7.1 | 16.1 |
| 1.78 | 4 |
| 1.85 | 6 |

Thus, the optimal ratio is of the order to 2.25 which means that molar ratios of about 1 should be considered.

Further experiments have shown that the optimal ratios vary with the ammonia concentration and, more generally, with the nitrogenous compounds concentration in the waste water, according to the following.

The results are given in number of Br or I moles for 1 Cl mole.

Water containing less than 1 mg/l of $NH_3$—N 0.05 – 0.7 mole of bromine or iodine, i.e., for 1 mg/l of chlorine, 0.125 to 1.60 mg/l of bromine.

Water containing more than 1 mg/l of $NH_3$—N 0.3 to 2 mole of bromine or iodine, i.e., for 1 mg/l of chlorine, 0.675 to 4.5 mg/l of bromine.

The best results were obtained with 0.8–1.2 mole of bromine.

Experiments have also been carried out for determining the total amounts of halogens required for lowering the number of coliforms in 100 ml city water below 1000. With the prechloration process according to the invention, 1 to 10 mg/l of chlorine were added to quantities of bromide, which amount to 1–20 mg/l of bromine. Coliforms can be completely eliminated by using 10 mg/l – 20 mg/l of chlorine with 10 – 30 mg/l of bromide (computed in bromine amount).

The following tests and tables 3a and 3b concern the water treatment by means of a mere mixture of chlorine and bromine, the two components being directly introduced into the water instead of being mixed in a reactor.

The water treated is similar to that of tables 2a and 2b. The bromine is introduced into the water under the form of a bromide as indicated in U.S. Pat. No. 2,443,429.

Two series of tests were carried out, reported in table a and b respectively.

Serie a : the bromide is injected upstream the chloration

Serie b : the bromide is injected downstream the chloration.

The number of residual coli was measured after 30 mn.

The given value is the average of three analyses.

Table 3a

| Bromide in mg/l of $Br_2$ | Chorine mg/l | Coli in 100ml |
|---|---|---|
| 0 | 7.1 | 99,000 |
| 4.2 | 6.7 | 81,000 |
| 9.8 | 6.9 | 79,000 |
| 20.1 | 7.3 | 42,000 |
| 40.5 | 6.9 | 8,000 |

Table 3b

| Bromide in mg/l of $Br_2$ | Chlorine mg/l | Coli in 100 ml |
|---|---|---|
| 0 | 7.0 | 82,000 |
| 6.1 | 7.2 | 73,000 |
| 15.2 | 6.9 | 33,000 |
| 24.8 | 6.8 | 17,000 |

A mere comparison of either one of table 3a, 3b with either one of tables 2a, 2b shown the superiority of the invention process.

For instance, 20 mg/l of bromine and 7.3 mg/l of chlorine result in 42,000 coli still alive (table 3a) while about the same amount of clorine (7.1 mg/l) with only 16.1 mg of bromine result in only 11,000 coli not killed (table 2a) when the bromide and chlorine have been premixed in a reactor.

If prechloration is effected, according to FIG. 5, at a rate of 5.5 mg/l and if 1.85 mg/l of chlorine are mixed in a reactor with 6 mg/l of bromine in the form of bromide and then injected into the water, the amount of coliforms falls down to 900 in 100 ml, while, when the bromine is directly poured into the waste water after chloration thereof, the disinfection is not improved (73,000 coli — table 3b), considering equal amount of halogens.

This important difference between the results obtained with the process of the invention and the former process, such as this of the cited US-specification, arises from the fact that when chlorine is poured into a water containing ammonia or more generally nitrogenous compounds, chloramines are rapidly formed. When bromide is then introduced into a water, the pH of which ranges generally from 6 to 8, there is no instantaneous release of bromine by the action of chloramines; since the rapidly formed chloramines are very stable, the latter only very slowly release the bromine contained in the bromide, if indeed they do release it, which has not been undubitably shown until now.

When, as in the experiment, the results of which are shown in table 3a, the bromide is first injected, the chlorine, when injected, meets about 28–30 mg/l of $NH_3$—N, amounting to about $10^{21}$ moles of $NH_3$ in 100 ml of water, and between 0–40 mg/l of bromide (in amount of $Br_2$), i.e. about $0–2.9 \times 10^{20}$ ions $Br^-$ per liter; the number of $NH_3$ moles is much greater than the number of $Br^-$ ions now, the velocity of the reaction between $Cl_2$ and the bromide being slow at the pH usual of the water to be treated, the reaction of the chlorine with $NH_3$ will first occur : when bromide competes with $NH_3$, only very little of the bromine is released. On the contrary, in the process according to the invention, active bromine and/or iodine are released in the reactor and therefore immediately form bromamines with ammonia when injected into the waste water, the results of tables 1 and 2 proceed from the germicidal action of the bromamines.

When chlorine is first injected, chloramines are formed which release only very little of the bromine, when the bromide is further injected. This is why, in the case 3b, the results are only slightly improved with respect to case 3a. It is noted also than, when chlorine is injected after bromide, the disinfection improves with the quantity of bromine introduced: indeed, the more of $Br^-$ ions are present, the more chances for the chlorine moles to meet a $Br^-$ ion before the meeting of a $NH_3$ ion, if the $NH_3$ concentration is constant.

Further tests have also proved that the more acid in the water (i.e. the smaller is the pH), the faster is the release of bromine from bromide. In the reactor according to the invention the pH is maintained in the preferred range 2.5–5.5 by means of regulating the chlorine concentration therein.

I claim:

1. Process for the sterilization or the disinfection of water containing ammonia nitrogen which comprises:
   reacting in a reactor wherein the pH is maintained between 2.5 and 5.5 and the temperature above 10°C; chlorine and a bromide, the molar ratio of the amount of chlorine and of the bromide being comprised between 1/0.05 and 1/2 where 1 is for the chlorine; and
   discharging the content of said reaction into said water, thereby disinfecting said water.

2. Process according to claim 1 wherein the pH in the reactor is maintained equal to or smaller than 3.5.

3. Process according to claim 1 wherein the chlorine is fed to the reactor under the form of concentrated chlorinated water.

4. Process according to claim 1 wherein the chlorine is fed to the reactor in gaseous state.

5. Process according to claim 1, for use for treating a water having less than 1 mg/l ammonia nitrogen compound content, wherein the said molar ratio is greater than 2.

6. Process according to claim 1, for use for treating a water having a greater than 1 mg/l ammonia nitrogen compound content, wherein the said molar ratio is smaller than 2.

7. Process according to claim 1 further comprising the prior injection of chlorine into said water prior to the said discharge, the amount of chlorine in said prior injection being just sufficient to satisfying the halogen immediate demand of said water.

* * * * *